Patented June 24, 1930

1,765,581

UNITED STATES PATENT OFFICE

ARCHIBALD JOHN HALL, OF TIMBERSBROOK, CONGLETON, ENGLAND, ASSIGNOR TO CELANESE CORPORATION OF AMERICA, A CORPORATION OF DELAWARE

PROCESS IN WHICH CELLULOSE ACETATE ARTIFICIAL SILK AND LIKE PRODUCTS ARE TREATED WITH HOT LIQUORS

No Drawing. Application filed July 22, 1925, Serial No. 45,416, and in Great Britain July 31, 1924.

This invention relates to the treatment of cellulose acetate products with hot or boiling aqueous liquors.

It is well known that when cellulose acetate artificial silk is immersed in boiling water or water whose temperature exceeds 85° C. it becomes curly and wool-like and loses a considerable proportion of its lustre and transparency. We have now discovered, and this discovery forms the basis of this invention, that such silk retains its original lustre, appearance and transparency when heated at about 100° C. for prolonged periods in an aqueous solution containing not less than a minimum quantity of a suitable protective substance. Many salts, chiefly neutral salts, have been found capable of acting as protective substances but the important fact which we have established is that their protective action is dependent on their concentration in the aqueous solution in which they are employed.

Generally, the protective power of suitable salts is greater in concentrated aqueous solutions than in dilute solutions. For example, cellulose acetate silk becomes woolly and opaque and loses most of its lustre when heated for three minutes in boiling water, but retains its original appearance and properties when heated for one hour at about 100° C. in an aqueous solution containing 12% of sodium chloride or 25% of crystalline sodium sulphate. On the other hand, cellulose acetate silk similarly heated for one hour at about 100° C. in an aqueous solution containing 5% of sodium chloride becomes somewhat woolly and suffers a partial loss of lustre and transparency.

It is necessary, therefore, that the concentration of the salt solutions used must be above a certain minimum, varying with the salt or mixture of salts employed, in order to ensure complete protection of the lustre. For convenience the minimum concentration at which any particular protective saline agent, whether said saline agent be a single salt or a mixture of salts, must be employed in order to prevent any loss of lustre is hereinafter termed its critical protective concentration.

The following substances have been found to act as protective substances towards cellulose acetate artificial silk:—

Substance

Ammonium bromide.
Ammonium chloride.
Ammonium chromate.
Ammonium oxalate.
Ammonium sulphate.
Alum.
Sodium bichromate.
Sodium sulphite.
Sodium phosphate (dibasic).
Sodium nitrite.
Sodium bisulphite.
Sodium acetate.
Sodium thiosulphate.
Sodium ferrocyanide.
Sodium chlorate.
Sodium nitrate.
Sodium bromide.
Calcium chloride.
Cadmium chloride.
Copper sulphate.
Chrome alum.
Ferrous ammonium sulphate.
Strontium chloride.
Potassium chromate.
Potassium ferrocyanide.
Zinc sulphate.
Tartar emetic.
Ferrous sulphate.
Zinc chloride.
Potassium sulphate.
Iron alum.
Barium chloride.
Magnesium chloride.
Magnesium sulphate.
Potassium chloride.
Sodium chloride.
Sodium sulphate.
Sodium hydrosulphite.
Aluminium chloride.
Sodium sulphite.
Ortho-aminophenol-para-sulphonic acid.
Ammonium nitrate.
Ammonium phosphate.
Potassium sulphite.
Potassium nitrate.
Potassium oxalate.

Pottassium phosphate (dibasic).
Magnesium nitrate.
Sodium tartrate.
Potassium nitrite.

All the above substances exert their protective action for cellulose acetate when used in from 10% to 30% aqueous solution but it is to be understood that these limits of concentration are only stated approximately and the following table gives the approximate value of concentration for several of the substances.

| Substance | Approximate concentration of aqueous solution in which protection of cellulose acetate is evident |
|---|---|
| Ammonium chloride | 10 grams in 100 cc. of water |
| Sodium sulphate | 25 |
| Sodium chloride | 10 |
| Magnesium sulphate | 10 |
| Magnesium chloride | 10 |
| Calcium chloride | 10 |
| Sodium phosphate | 20 |
| Potassium sulphate | 20 |
| Barium chloride | 20 |
| Strontium chloride | 20 |
| Ammonium bromide | 10 |
| Aluminium chloride | 20 |
| Potassium chromate | 20 |
| Sodium sulphite | 20 |
| Sodium hydrosulphite | 20 |

Our discovery of the protective action of protective substances for cellulose acetate silk is important since it enables this textile material to be immersed in or otherwise treated with aqueous solutions at higher temperatures than has hitherto been possible in such operations as bleaching, scouring, dyeing, printing and steaming. Further, union fabrics containing cellulose acetate silk may be treated without injury to the silk with such hot or boiling liquors as is desirable for the purpose of scouring, dyeing or otherwise treating the other fibres present in the fabric, for example cotton, linen, wool or silk.

Among numerous processes in which our discovery has useful applications is the dyeing in boiling liquors of fabrics containing cellulose acetate and woollen fibres, the discharging of dyed cellulose acetate fabrics in boiling liquors and the relief or production of latent strains in cellulose acetate fabrics or products by immersion in a boiling aqueous liquor.

What I claim and desire to secure by Letters Patent is:—

1. Process for preventing loss of lustre in bleaching, dyeing, printing, steaming and otherwise treating textile materials, films and other materials comprising cellulose acetate at temperatures in excess of about 85° C., characterised in that the treatment is effected in the presence of a protective saline agent comprising a neutral ammonium salt in an aqueous solution of a concentration effective to maintain the lustre of said materials.

2. Process for preventing loss of lustre in treating textile materials, films and other materials, comprising cellulose acetate in the presence of water at temperatures in excess of about 85° C., comprising effecting the treatment in the presence of an aqueous solution containing between about 10% and about 30% of a neutral ammonium salt.

In testimony whereof I have hereunto subscribed my name.

ARCHIBALD JOHN HALL.